Patented Nov. 16, 1926.

1,607,090

UNITED STATES PATENT OFFICE.

GUY LEONARD, OF BALTIMORE, MARYLAND.

STENCIL SHEET.

No Drawing.　　Application filed February 26, 1926. Serial No. 90,968.

This invention relates to coated tissue-paper sheets which are usually typed to convert them into stencils preparatory to making duplicate copies therefrom.

It has been proposed to coat a sheet of yoshino with cellulose nitrate softened by oils and greases. Cellulose nitrate, however, is highly unstable and objectionably inflammable, impairing the quality of the stencil-sheet in which it is used, as it is comparatively short-lived and unsuitable for use in many climates.

In attempting to minimize these objectionable qualities it becomes necessary to ship and store stencil-sheets containing cellulose nitrate in air and water tight covers, to protect them from exposure to atmospheric conditions.

Even if the stencil-sheet is originally in good condition, it is subject to still other deterioration, due to the use of oils and greases which it is proposed to use as softeners or tempering agents for the nitro-cellulose coating. The presence of the oils tends towards rancidity in time, with consequent disagreeable and impaired qualities.

To avoid the deficiencies of nitro-cellulose, I use acetate of cellulose in a novel preparation, which when combined with a tissue sheet results in an inexpensive, ink-proof, pliable, durable and stable stencil-sheet, readily stencilized, yielding excellent copies, and which, owing to its stability, is unaffected by climatic conditions and may be kept for years before typing.

A further object of the invention is to produce a stencil-sheet which is practicable to handle, being dry to the touch, neither greasy nor oily, allowing of its repeated use after being filed away for a considerable time, for additional copies as required.

Cellulose acetate is the binder or body-forming film of the novel coating preparation.

If it were attempted to produce a stencil-sheet coated with a film using only cellulose acetate (in a suitable solvent) it would be found impracticable. It could not be typed without severing the fibers of the tissue paper.

If it were possible to overcome this difficulty by preparing a stencil-sheet wherein the quantity of cellulose acetate solution was so minimized that no film was formed, but simply the fibers were coated to protect them, then the finished sheet would also be found to be impracticable, in that when used on a duplicator the ink would permeate and pass through the stencil-sheet.

Moreover, the paper, being cellulose, might tend to physically combine with the cellulose acetate, it being also a cellulose product. To avoid such combining, I employ a tempering agent.

When using cellulose acetate, it is necessary to dispense with oils. The oil and the acetate will not mix. Oils have been used for softening other coatings, so that they will take the impressions of the type. Without the oils, the types would not penetrate such coating, or else the types would cut out the loop letters from the sheet. But if it were attempted to use cellulose acetate with an oil, such as castor oil, said oil would not form with the cellulose acetate a homogeneous body. The same would be true if other oils were added, such as soya bean oil; and it would further be impracticable to use lard, cottolene, tallow, etc.

For a softener I use in place of oils diethylphthalate and glycerin. They form with the cellulose acetate a homogeneous coating. A solution of these three ingredients forms a true solution, making no trouble. I use acetanilid to render the cellulose acetate plastic, and soften the coating by glycerin and diethylphthalate.

The acetanilid, glycerin, diethylphthalate and cellulose acetate are dissolved in acetone and alcohol, to form a coating mixture. I employ the following mixture, the parts being given by weight: acetanilid 16, glycerin 8, diethylphthalate 30, denatured alcohol 40, and 8 per cent solution of cellulose acetate in acetone (or methyl acetone) 100.

The acetanilid, glycerin and diethylphthalate prevent the cellulose acetate from forming a physical homogeneous body with the paper itself, both of them being cellulose products. The coating mixture enables the type to hit the stencil-sheet and to leave intact the exposed fiber of the paper, which is open-mesh or loose-fibered tissue.

The acetanilid forms a plastifying and stabilizing agent. Acetanilid prevents the film from being too tough and not allowing the type to cut through. In addition, the acetanilid prevents the ink from coming through the sheet. A homogeneous body is formed by the acetanilid and cellulose acetate solution. It makes the coating more plastic, and under the impact of the type it parts, yet it prevents the ink from coming through any part of the sheet except the typed portion. It works well with cellulose acetate and with two softeners.

The diethylphthalate is a softening or tempering ingredient which is soluble in alcohol or other common solvent, and contributes to the production of a homogeneous dry coating upon the evaporation of the solvent.

An efficient coating can be produced by using triphenolphosphate in place of acetanilid in the foregoing mixture. Butyl alcohol forms a solvent for the diethylphthalate, acetanilid and triphenolphosphate.

Triacetin is another softening agent that may be employed as part of the aforesaid coating mixture.

In preparing the coating bath: To an 8 per cent solution of cellulose acetate in a suitable solvent (such as acetone, methyl acetone, etc.) is added a solution of acetanilid, glycerin, diethylphthalate and alcohol, heated to about 40 to 50 degrees centigrade; the mixture being thoroughly agitated during the operation, at which time any suitable dye soluble in the common solvents may be added.

The paper can be dipped into this bath at ordinary room temperature.

In this bath the yoshino paper sheet may be immersed or the sheet may be floated upon the liquid. Excess liquid may be removed from the sheet, and the same may be hung up to dry.

The solvents acetone and alcohol are thus permitted to evaporate from the coated sheet. The coating has the further advantage of being quick-drying. It dries in about 10 minutes and is ready for stencilizing use in the typewriting machine, or for shipment.

In certain cases an extremely sensitive and impressionable sheet is desired, in which case the dried sheet may be dipped in a solution of a mixture (by weight) of 100 parts of methyl, denatured or butyl alcohol; 40 parts palm butter, and 10 parts stearic acid. It will be understood that other solutions may be used, and serve to make more sensitive the aforesaid dry coating, but the foregoing is preferred. For ordinary purposes this second dipping may be omitted.

After passing through the second solution, the sheet may be again dried, and is then ready for shipment, and for use upon the typewriting machine for stencilizing.

The proportions may be varied within the scope of the invention, and there is permissible certain variation in the softening and plastifying ingredients.

There is not disclosed herein a sheet which is rendered impressible by the types by reason of coating the sheet with any fatty-acid ester of cellulose. If it should be attempted to produce a stencil-sheet by coating the same with the herein-described cellulose acetate alone, such coating would be found to be tough and hard, so that it would not be capable of being cut or stenciled by the types of the typewriter. According to this invention, the toughness of the ink-proof cellulose acetate coating may be substantially modified by the herein-described glycerin. Glycerin, however, is not ink-repellent, but is apt to be dissolved by ingredients in the ink, and a sheet coated merely with cellulose acetate and glycerin would therefore be apt to permit the ink to work through the sheet. This liability of leakage of ink is overcome by combining with said ingredients a plastifier and stabilizer which itself lends an ink-repellent quality, viz, acetanilid, and which as set forth combines with the cellulose acetate and the glycerine to form a homogeneous coating having the requisite ink-proof property, and possessing the other advantages hereinbefore set forth.

The coating preparation can be colored with any dye that is soluble in alcohol, or in a common solvent of the solution.

The invention is not limited to the proportions given, nor to the exact ingredients named, and variations may be resorted to in carrying out the process. It is not necessary in all cases to employ either entire formula, as portions thereof may be used within the scope of the invention.

In typing the stencil, there should be used an ordinary manila backing sheet. Such manila backing may be coated with a preparation of carnauba wax and stearic acid in the proportions of carnauba wax 30 parts, stearic acid 5 parts and benzol 100 parts by weight. The manila backing may be dipped in or floated over this solution. When the type hits the stencil-sheet, this coated backing holds the stencil-sheet in place, and it does not slip about, and makes a clearer copy. Proof-reading can be done on this coated manila backing. It makes a sharper cut and nicer work.

I claim:

1. A stencil-sheet of loose-fibered tissue coated with cellulose acetate plastified and stabilized by acetanilid, and combined with a softening agent.

2. A stencil-sheet of loose-fibered tissue coated with cellulose acetate plastified and stabilized by acetanilid, and softened by glycerin and diethylphthalate.

3. A stencil-sheet of loose-fibered tissue coated with cellulose acetate plastified and stabilized by acetanilid, and combined with a softening agent including glycerin.

4. A stencil-sheet of loose-fibered tissue coated with cellulose acetate plastified and stabilized by acetanilid, and combined with a softening agent including diethylphthalate.

5. A mixture for coating a stencil-sheet, including cellulose acetate, acetanilid, glycerin, diethylphthalate, and a solvent.

6. A mixture for coating a stencil-sheet, including cellulose acetate, acetanilid, glycerin, diethylphthalate, and a solvent including acetone and alcohol.

7. A stencil coating preparation including by weight 8 parts of cellulose acetate, 16 parts of acetanilid, 8 parts of glycerin, 30 parts of diethylphthalate, 92 parts of acetone, and 40 parts of alcohol.

8. A stencil-sheet of open tissue coated with a solution of cellulose acetate whose toughness is reduced by a non-oleaginous plastifying and stabilizing agent and by a non-oleaginous softening agent, sufficiently to form with said cellulose acetate a homogeneous ink-proof body which may be readily stenciled by the types of a typewriter.

9. A stencil-sheet of open tissue coated with cellulose acetate, forming a homogeneous body with (1) a non-oleaginous agent which is plastifying, stabilizing and ink-proofing, and (2) a non-oleaginous agent which is softening.

10. A stencil-sheet of open tissue coated with cellulose acetate, forming a homogeneous body with (1) a non-oleaginous agent which is plastifying, stabilizing and ink-proofing, and (2) a non-oleaginous agent which is softening, all of said ingredients having a common solvent.

11. The process of heating the described stencil-coating bath of acetanilid, glycerin, diethylphthalate and alcohol to 40 or 50 degrees centigrade, and adding the same to an 8 per cent solution of cellulose acetate in acetone or in methyl acetone.

12. The process of heating the described stencil-coating bath of acetanilid, glycerin, diethylphthalate and alcohol to 40 or 50 degrees centigrade, adding the same to an 8 per cent solution of cellulose acetate in acetone or in methyl acetone, and adding a dye.

13. The herein-described sensitizing solution for a previously-coated stencil-sheet, including denatured alcohol or butyl alcohol, or suitable solvent, palm butter, and stearic acid.

14. The herein-described sensitizing solution for a previously-coated stencil-sheet, including 100 parts by weight of denatured alcohol or butyl alcohol, 40 parts palm butter, and 10 parts stearic acid.

15. A stencil-sheet of open tissue coated with cellulose acetate which is capable of resisting ink, but whose toughness is materially reduced by a softening agent which is not ink-resisting, and by a plastifying and stabilizing agent which augments the ink-proof property of the cellulose acetate, said agents forming with the cellulose acetate a homogeneous body rendering the sheet sufficiently ink-proof for stenciling.

GUY LEONARD.